(12) United States Patent
Lindee

(10) Patent No.: US 8,627,941 B2
(45) Date of Patent: Jan. 14, 2014

(54) FOOD PRODUCT POSITIONING SYSTEM AND METHOD

(75) Inventor: Scott Lindee, Mokena, IL (US)

(73) Assignee: Formax, Inc., Mokena, IL (US)

( * ) Notice: Subject to any disclaimer, the term of this patent is extended or adjusted under 35 U.S.C. 154(b) by 562 days.

(21) Appl. No.: 12/606,846

(22) Filed: Oct. 27, 2009

(65) Prior Publication Data

US 2010/0107835 A1    May 6, 2010

Related U.S. Application Data

(60) Provisional application No. 61/108,789, filed on Oct. 27, 2008.

(51) Int. Cl.
 *B65G 43/08* (2006.01)
 *B65G 47/256* (2006.01)

(52) U.S. Cl.
 CPC .................................. *B65G 47/256* (2013.01)
 USPC ....................................................... 198/395

(58) Field of Classification Search
 USPC ......... 198/373, 379, 382, 395, 401, 406, 411, 198/414, 468.01
 See application file for complete search history.

(56) References Cited

U.S. PATENT DOCUMENTS

| | | | |
|---|---|---|---|
| 3,812,647 A | 5/1974 | Bertling et al. | |
| 3,952,478 A | 4/1976 | Richards | |
| 4,026,421 A | 5/1977 | Lotz | |
| 4,054,967 A | 10/1977 | Sandberg et al. | |
| 4,136,504 A | 1/1979 | Wyslotsky | |
| 4,182,003 A | 1/1980 | Lamartino et al. | |
| 4,226,540 A | 10/1980 | Barten et al. | |
| 4,329,828 A | 5/1982 | Wagner | |
| 4,413,279 A | 11/1983 | Gorl | |
| 4,416,103 A | 11/1983 | Ewer et al. | |
| 4,592,692 A | 6/1986 | Suizu et al. | |

(Continued)

FOREIGN PATENT DOCUMENTS

| | | |
|---|---|---|
| DE | 4203118 | 5/1993 |
| EP | 0416441 | 3/1991 |

(Continued)

OTHER PUBLICATIONS

European Patent Office, Extended European Search Report for Application No. 11006933.3-2308 / 2404829 dated Jan. 17, 2013.

(Continued)

*Primary Examiner* — William R Harp
(74) *Attorney, Agent, or Firm* — Klintworth & Rozenblat IP LLC

(57) ABSTRACT

A food handling system having a positioning system and method. The positioning system includes a main conveying surface, an electronic sensor, a controller and a robot. The main conveying surface is configured to move food products. The electronic sensor is configured to capture position data about one or more food products on the main conveying surface within a sensor range of the sensor. The controller is signal-connected to the electronic sensor and the robot. The controller is configured to receive data captured by the sensor and is configured to instruct the robot to move a food product to a destination position. The robot is configured to reposition one or more food products on the conveying surface according to instructions sent by the controller. The robot has a longitudinal and a lateral working range. The food product may include formed meat patties or sliced meat or cheese products.

18 Claims, 12 Drawing Sheets

(56) References Cited

U.S. PATENT DOCUMENTS

| | | | |
|---|---|---|---|
| 4,773,813 | A | 9/1988 | Nakashima et al. |
| 4,894,976 | A | 1/1990 | Wallace et al. |
| 4,976,582 | A | 12/1990 | Clavel |
| 5,040,056 | A * | 8/1991 | Sager et al. .................... 348/88 |
| 5,041,907 | A * | 8/1991 | Sager et al. .................... 348/91 |
| 5,241,365 | A | 8/1993 | Haagensen |
| 5,267,168 | A | 11/1993 | Antonissen et al. |
| 5,458,055 | A | 10/1995 | Fitch, Jr. |
| 5,480,278 | A | 1/1996 | Morgan |
| 5,499,719 | A | 3/1996 | Lindee |
| 5,628,237 | A | 5/1997 | Lindee et al. |
| 5,649,463 | A | 7/1997 | Lindee |
| 5,675,963 | A | 10/1997 | Nicholson et al. |
| 5,704,265 | A | 1/1998 | Johnson et al. |
| 5,720,593 | A | 2/1998 | Pleake |
| 5,752,366 | A | 5/1998 | Wilfong et al. |
| 5,810,149 | A | 9/1998 | Sandberg |
| 5,860,504 | A | 1/1999 | Lazzarotti |
| 5,901,613 | A | 5/1999 | Forslund |
| 5,924,546 | A | 7/1999 | Funaya |
| 5,974,925 | A | 11/1999 | Lindee et al. |
| 6,122,895 | A | 9/2000 | Schubert |
| 6,152,284 | A | 11/2000 | Sandberg et al. |
| 6,374,984 | B1 * | 4/2002 | Nagler .................... 198/382 |
| 6,577,093 | B1 | 6/2003 | Hvittfeldt et al. |
| 6,646,404 | B2 * | 11/2003 | Okuyama et al. ........ 318/568.13 |
| 6,688,451 | B2 | 2/2004 | Derby |
| 6,711,880 | B2 * | 3/2004 | Wipf et al. .................... 53/450 |
| 6,779,647 | B1 * | 8/2004 | Nagler .................... 198/395 |
| 6,935,215 | B2 | 8/2005 | Lindee et al. |
| 6,997,089 | B2 | 2/2006 | Lindee |
| 7,065,936 | B2 | 6/2006 | Lindee et al. |
| 7,188,544 | B2 | 3/2007 | Persson et al. |
| 7,278,344 | B2 | 10/2007 | Pryor et al. |
| 7,328,542 | B2 | 2/2008 | Sandberg et al. |
| 7,335,013 | B2 | 2/2008 | Hansen et al. |
| 7,411,137 | B2 | 8/2008 | Sandberg et al. |
| 7,904,198 | B2 | 3/2011 | Hawes |
| 2005/0075752 | A1 * | 4/2005 | Ban et al. .................... 700/213 |
| 2006/0182602 | A1 | 8/2006 | Schuler et al. |
| 2006/0182603 | A1 | 8/2006 | Hawes |
| 2008/0131253 | A1 | 6/2008 | Scott et al. |
| 2008/0250944 | A1 | 10/2008 | Pryor et al. |
| 2009/0120256 | A1 | 5/2009 | Pasek |
| 2010/0101191 | A1 | 4/2010 | Lindee |
| 2010/0107836 | A1 | 5/2010 | Lindee |

FOREIGN PATENT DOCUMENTS

| | | |
|---|---|---|
| EP | 0713753 | 5/1996 |
| FR | 275429 | 4/1998 |
| FR | 2754239 | 10/1998 |
| WO | 9908844 A1 | 2/1999 |
| WO | 9962344 A1 | 12/1999 |
| WO | 2005027667 A2 | 3/2005 |
| WO | 2005051812 | 6/2005 |
| WO | 2005102620 | 11/2005 |
| WO | 2007083327 | 7/2007 |
| WO | 2007138616 | 12/2007 |

OTHER PUBLICATIONS

European Patent Office, Extended European Search Report for EP Application No. 09 829 594.2, 10 pages, mailed Sep. 13, 2012.

European Patent Office, Partial European Search Report for Application No. 13003671.8-1708, mailed Sep. 24, 2013, 6 pages.

European Patent Office, Extended European Search Report for Application No. 13003671.8-1708, mailed Nov. 12, 2013, 9 pages.

* cited by examiner

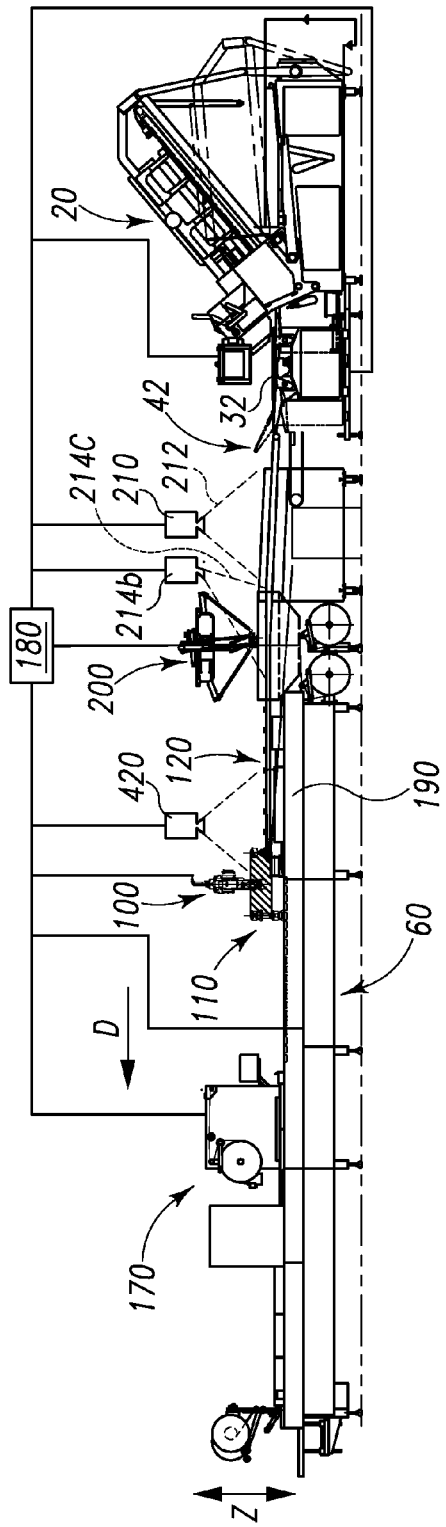
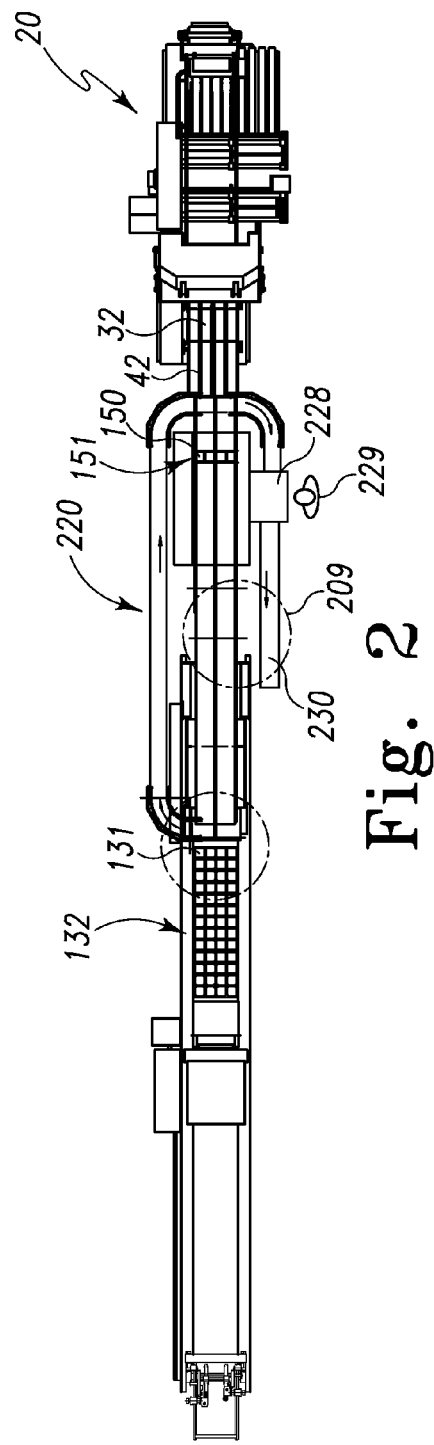
Fig. 1
Fig. 2

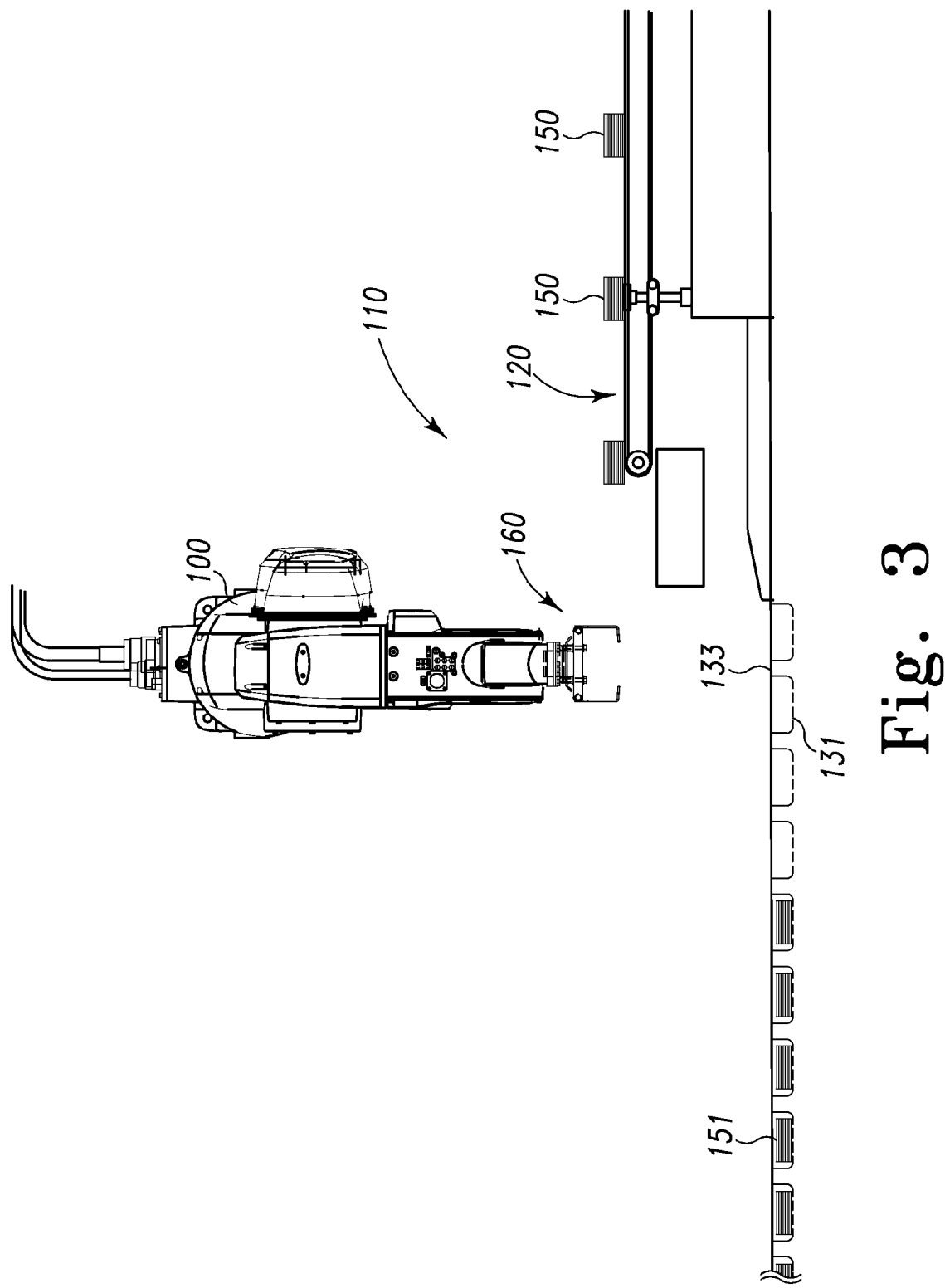

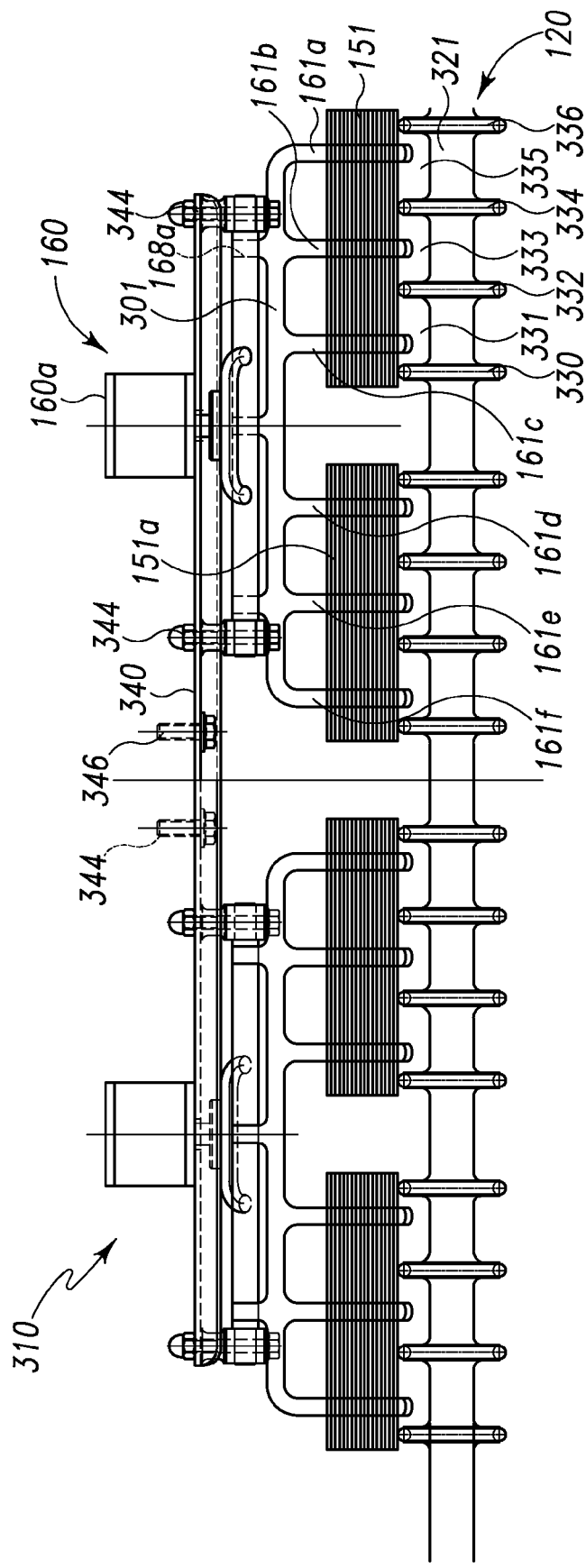

FOOD PRODUCT POSITIONING SYSTEM AND METHOD

This application claims the benefit of U.S. provisional patent application Ser. No. 61/108,789 filed on Oct. 27, 2008.

FIELD OF THE INVENTION

The invention relates to a system for handling food products from an apparatus that slices or forms the food products. Particularly, the invention relates to food product positioning system for positing food products on a conveyor.

BACKGROUND OF THE INVENTION

Food product machines, particularly high speed slicers, produce groups of food products. Those groups may be stacked vertically or may be shingled. Food patty forming machines product food product including formed meat patties. The food products may be conveyed away from the food product machine by a main conveyor. The groups of food products may then be supplied to packaging equipment, such as a fill and package apparatus, in a food product stream to be packaged for shipment. The food products as received from the food product machine may not be in a preferred pre-defined position or orientation on the conveyor to facilitate optimum or efficient downstream processing, such as packaging.

Sliced food products may be formed from a slicer such as disclosed in U.S. Pat. Nos. 5,628,237, 5,974,925, herein incorporated by reference, and commercially available as a FX180® slicer machine. The slicer may also be such as disclosed in U.S. Patent Application No. 60/999,961, herein incorporated by reference, and commercially available as a PowerMax4000™ slicer available from Formax Inc. of Mokena, Ill., USA. Formed food products may be made by a patty forming machine such as disclosed in, for example, U.S. Pat. Nos. 3,952,478; 4,054,967; 4,182,003; and 4,329,828, and PCT published applications WO 99/62344, and WO 2005/02766782 A2, herein incorporated by reference, or those commercialized by Formax, Inc. of Mokena, Ill., including the F-26™, ULTRA26™, Maxum700®, F-19™, F-400™, or F-6™ patty forming machines.

In one type of fill and package apparatus for sliced food products, a slicer delivers groups of slices or "drafts" onto a conveyor. The drafts are conveyed spaced-apart in a stream to a staging conveyor where the stream is converted to lateral rows of drafts. Such a staging conveyor is described in U.S. Pat. No. 5,810,149, herein incorporated by reference, and commercially available as the A*180 Autoloader from Formax, Inc. of Mokena, Ill., U.S.A. Alternatively, the drafts may be placed on the conveyor by the slicing machine in lateral rows of drafts alleviating the need of a staging conveyor. Fill and package apparatus for sliced or formed food products are disclosed in U.S. Pat. No. 7,065,936 or 7,328,542, which are herein incorporated by reference.

In one type of fill and package apparatus for formed food products, the patty forming machine delivers a formed food product or a stack of food products onto an output conveyor. When formed food products are provided as a stack of food products, a food product forming machine may eject a number of food products on top of one another before the food products are advanced by the output conveyor. Also, a paper interleaving device such as disclosed in U.S. Patent Application No. 60/730,304, which is hereby incorporated by reference, and commercially available from Formax Inc., may be placed at the output of the food product forming machine to interleave paper between each food product in a food product stack. Whether the food products lay individually or in stacks on the output conveyor, the food products may be arranged in transverse rows.

The food product groups must be maintained within close tolerances, particularly as to weight; under-weight groups constitutes a potential fraud on the ultimate users and over-weight groups may represent an appreciable loss of revenue to the plant operator. Even with the most sophisticated and technologically advanced controls, the slicing machines and like food product machines that produce the groups of food products may not always maintain those groups within the preset tolerance limits. This is particularly true when the food product machine first starts in operation and again whenever there is any change in operation, such as a change from one food loaf to another in the operation of a food loaf slicer or a change of bacon slabs in a bacon slicer. Moreover, even those food products that are within the preset tolerance, known as "accept" groups, must be transported to a packaging station or other utilization location.

To minimize waste, it is desirable to correct any out-of-tolerance or "reject" food product groups. A check weight conveyor, such as disclosed in U.S. Pat. Nos. 6,997,089 and 5,499,719, and U.S. Patent Application Ser. Nos. 60/729,957, and 11/454,143, may be used to divert rejected food products to an off-weight stream or food product correction stream or location. When rejected food products are taken out of the main food product stream a food product vacancy is created in the food product stream.

The present inventors recognize it is advantageous to re-orientate or reposition food products received from a food product machine on a conveyor. The present inventors recognize it would be desirable to provide a device capable of precisely orientating or positioning one or more food products on a moving conveyor. The present inventors recognize that it would be desirable to provide a device capable of precisely orientating or positioning food products on a moving conveyor to facilitate efficient and optimum or efficient downstream processing, such as packaging.

SUMMARY OF THE INVENTION

The invention includes a food handling system having a positioning system. The positioning system includes a main conveying surface, an electronic sensor, a controller and a robot. The main conveying surface is configured to move food products. The electronic sensor is configured to capture position data about one or more food products on the main conveying surface within a sensor range of the sensor. The controller is signal-connected to the electronic sensor and the robot. The controller is configured to receive data captured by the sensor and is configured to instruct the robot to move a food product to a destination position. The robot is configured to reposition one or more food products on the conveying surface according to instructions sent by the controller.

In one embodiment, the robot has a longitudinal working range for positioning a one or more food products to a destination position either upstream or downstream from an original position of the food product with respect to a conveying direction of the conveying surface.

In one embodiment, the robot has a lateral working range for positioning one or more food products to a destination position transverse from an original position of the food product in relation to a conveying direction of the conveying surface.

In one embodiment, the sensor captures an orientation of one or more food products on the conveying surface within the sensor range.

In one embodiment, the controller has instruction for determining whether a food product is in a mis-orientated position on the conveying surface by comparing a measured orientation with a predefined orientation or a predefined orientation range. The controller has instructions for directing the robot to move a particular food product from the misorientated position to a corrected orientation. The robot has a rotatable ripper for rotating an orientation of one or more food products about at least one axis of rotation.

In one embodiment, the controller has instruction for determining whether a food product is in a misaligned position on the conveying surface. The controller has instructions for directing the robot to move a particular food product from the misaligned position to an aligned position.

In one embodiment, each food product has a transverse position and a longitudinal position on the conveying surface. The sensor is capable of generating a signal representing a captured position including the transverse and the longitudinal position of one or more food products on the conveying surface within the sensor range. The controller has position determining instructions configured to compare the captured position with a predefined position to determine whether the product is mis-positioned; and the controller is configured to send corrected food product movement instructions to the robot to move a mis-positioned food product to a corrected food product position.

In one embodiment, the controller has a datastore having at least one predefined transverse centerline value representing a transverse position on which selected food products are to be aligned to form a transverse row on the conveying surface. The controller has a misaligned food product calculating instruction for determine whether a measured food product position value received from the sensor is outside of the transverse centerline value. The controller is configured to instruct the robot to move one or more misaligned food products into an alignment position on the transverse centerline.

In one embodiment, the controller has a datastore having at least one predefined longitudinal centerline value representing a longitudinal position on which the food products are to be aligned to form a transverse row on the conveying surface. The controller has a misaligned food product calculating instruction for determine whether a measured food product position value received from the sensor is outside of the longitudinal centerline value. The controller is configured to instruct the robot to move misaligned food products into an alignment position on the longitudinal centerline.

In one embodiment, the robot is configured to re-positioning food products on the conveying surface while the conveying surface is moving. The robot may also be configured to re-orientate food products while the conveying surface is moving.

In one embodiment, the robot has a gripper for holding the food product. The gripper has at least two gripping arms. The gripper has an open position for releasing a food product, and a closed position for holding and transporting a food product. The gripping arms may have lower supports for supporting the bottom of a food product when the grippers are in a closed position.

In one embodiment, the system includes a rotatable slicing blade, a conveying assembly, and a support for holding a loaf in a cutting path of the rotatable slicing blade, the slicing blade arranged to rotate in the cutting path to slice drafts from the loaf, the drafts being plural slices formed in a pile on the conveying assembly and the piles are transported onto the main conveyor.

In one embodiment, the system includes a patty-forming machine, the patty-forming machine having a machine frame, a mold plate having at least one cavity and mounted to reciprocate in a longitudinal direction with respect to the frame to position the cavity between a fill position and patty knock out position, a food product delivery channel for delivering food product into the cavity, the food product delivery channel mounted stationary with respect to the frame and having a fill opening into the cavity when the mold plate is in the fill position, one or more knockout plungers for expelling the formed food product from the mold plate onto an output conveyor when the mold plate is in the knockout position.

Numerous other advantages and features of the invention will become readily apparent from the following detailed description of the invention and the embodiments thereof, from the claims, and from the accompanying drawings.

BRIEF DESCRIPTION OF THE DRAWINGS

FIG. 1 is a schematic side view of a food product slicing and packaging line that incorporates the invention;

FIG. 2 is a top view taken from FIG. 1;

FIG. 3 is a side view of a packing station;

FIG. 5B is a second side view of the gripper and a main conveyor;

DETAILED DESCRIPTION

Figure 1A:
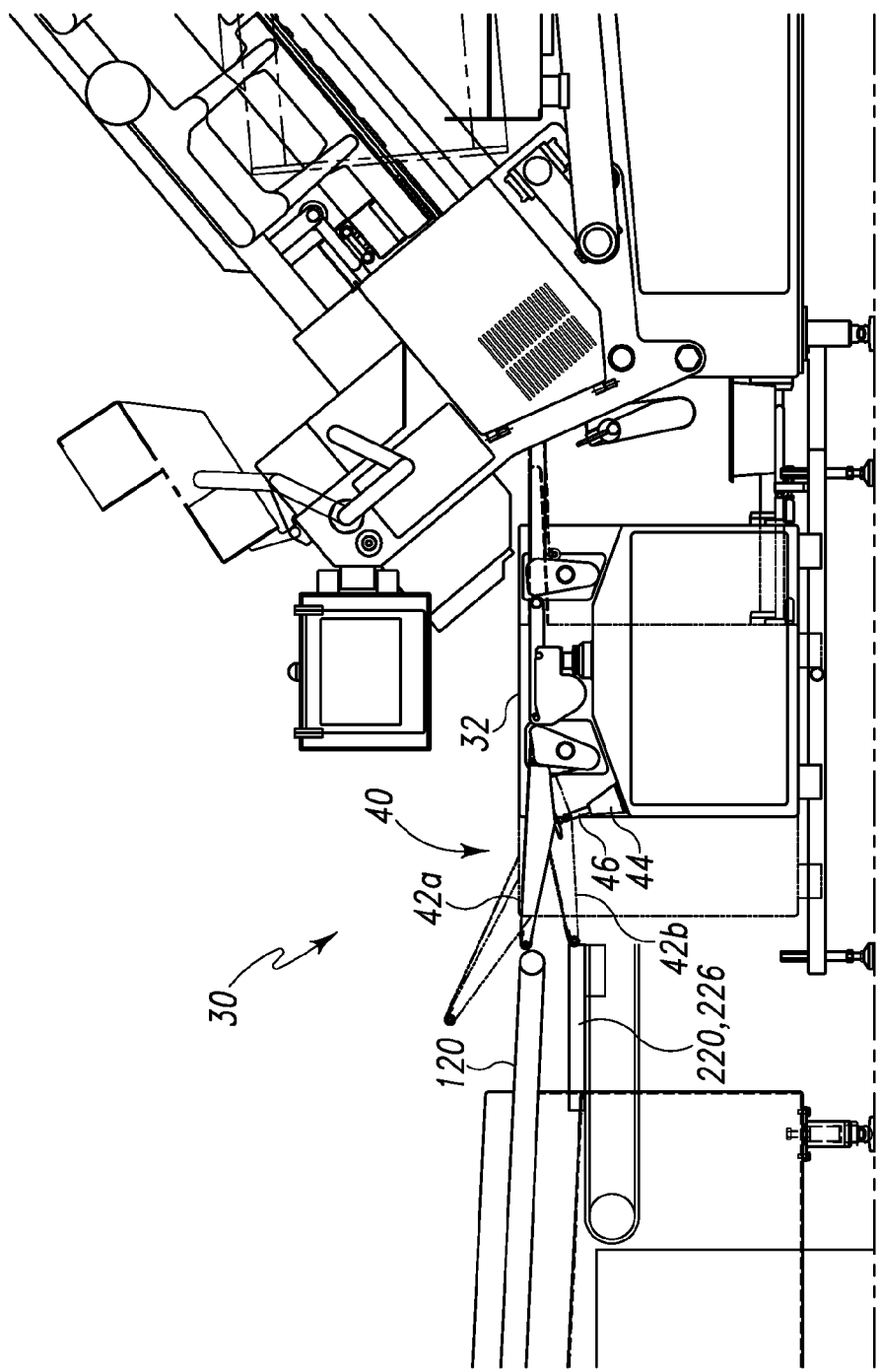
FIG. 1A is an enlarged side view, taken from FIG. 1, of an output conveyor including a weigh conveyor and a classifying conveyor.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated. This application claims the benefit of U.S. provisional patent application Ser. No. 61/108,789 filed on Oct. 27, 2008, which is hereby incorporated by reference.

System Overview

As shown in FIGS. 1 and 2, a system according to the invention includes a slicing machine 20 which cuts slices from one or more loaves and deposits the slices on an output conveyor assembly 30, forming shingled or stacked drafts, or food products. The drafts can be piles, bunches or groups of thin sliced product. The slicing machine 20 can be of a type as described in U.S. Pat. Nos. 5,649,463; 5,704,265; and 5,974,925; as well as patent publications EP0713753 and WO99/08844, herein incorporated by reference. The slicing machine 20 can also be a FORMAX FX180 machine, commercially available from Formax, Inc. of Mokena, Ill., U.S.A. In FIG. 1C the slicing machine 20 is shown in simplified form. The slicing machine is for cutting off a series of slices from a food loaf "L." The slicing machine is located upstream from the sensor range and produces food products received by the conveying surface. The slicing machine has a rotatable slicing blade "B", a conveying assembly 30, and a support "S" for holding a loaf in a cutting path of the rotatable slicing blade. The slicing blade is arranged to rotate in the cutting path to slice drafts from the loaf, the drafts, such as shingled or stacked slices 150 (described below) on the conveying assembly and the drafts are transported onto the main conveyor 120.

Figure 1B:
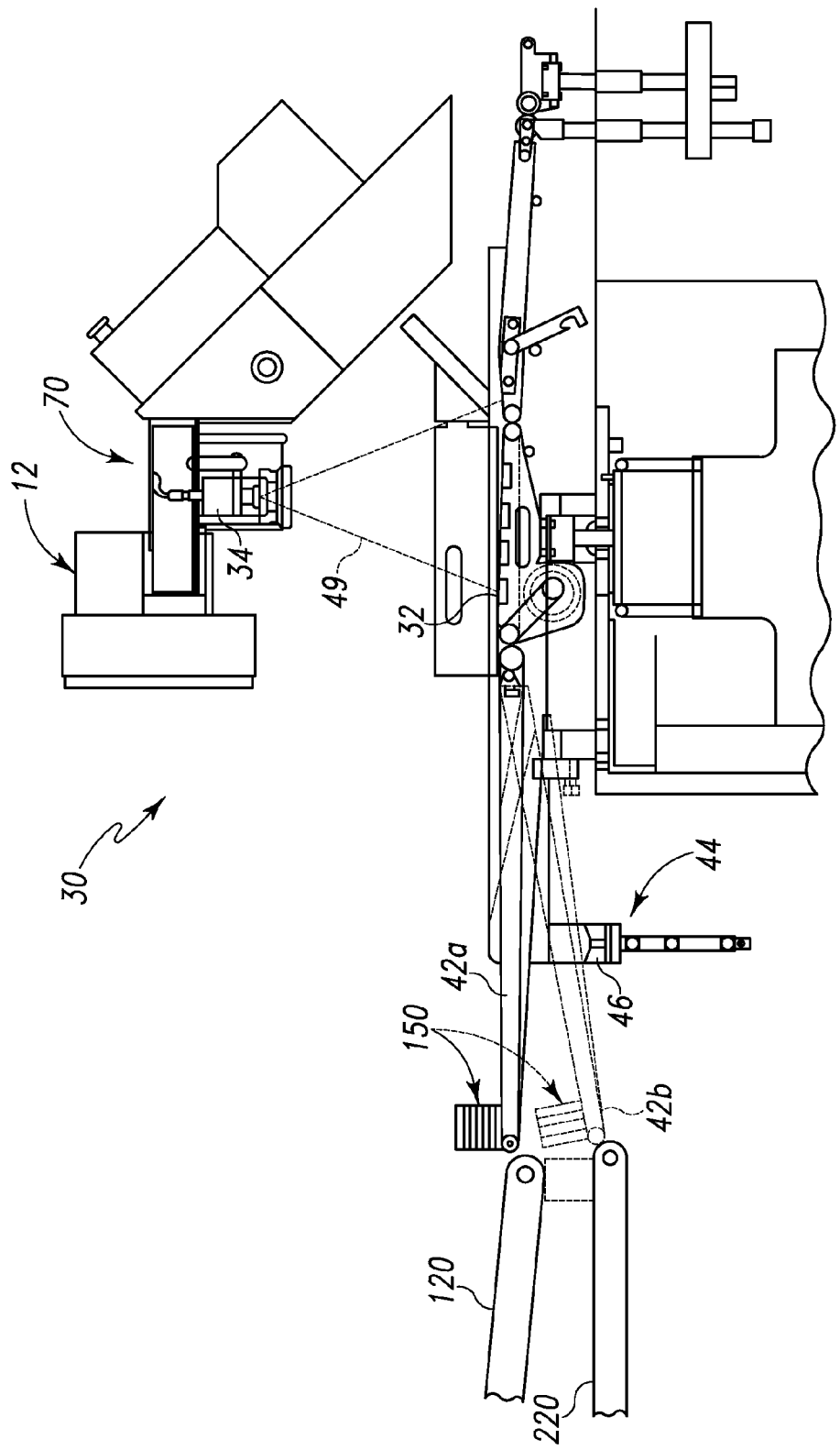
FIG. 1B is an end view of an optical grading system and the classifying conveyor.
Figure 1C:
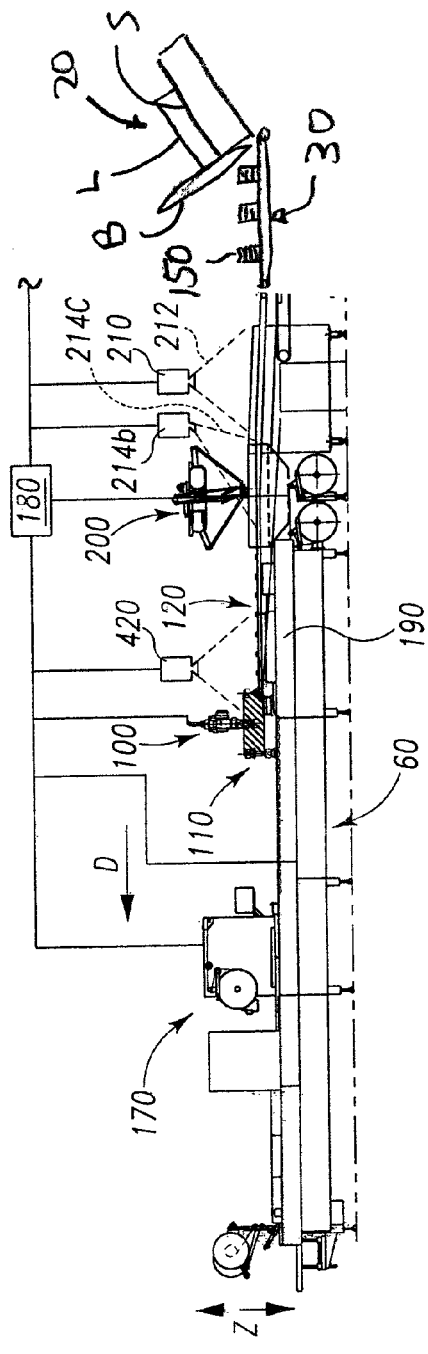
FIG. 1C is a simplified schematic side view of the food product slicing and packaging line of FIG. 1 using a slicing apparatus.

In one embodiment shown in FIG. 1A, the output conveyor assembly 30 includes a check weight conveyor 32, such as disclosed in U.S. Pat. Nos. 6,997,089 and 5,499,719, and U.S. Patent Application Ser. Nos. 60/729,957, and 11/454,143, wherein unacceptable drafts can be rejected and diverted. In another embodiment as shown in FIG. 1B, the conveyor assembly 30 includes an optical grading system 70, such as disclosed in U.S. Pat. No. 6,997,089, which is herein incorporated by reference. In another embodiment, the conveyor assembly 30 comprises a classifying conveyor 42 as shown in FIG. 1A. The weighing conveyor 32, and the optical grading system 70, and the classifying conveyor 42 are located upstream of a main conveyor 120 and an alignment robot 200.

An off-weight conveyor 220 is at least partially adjacent to the main conveyor 120 as shown in FIG. 2. The off-weight conveyor 220 connects to a weight correction station 228. The weight correction station 228 connects to a parking station 230.

The system comprises an alignment and orientation camera or sensor 210 that has a sensor range area 212 focused on an area upstream and/or within a working diameter or area 209 of an alignment robot 200. The alignment robot is located above the main conveyor 120. A shuttle robot 100 is located above or adjacent to a downstream end portion of the main conveyor 120 and a fill station 110 and has a shuttle working diameter or area 410. A shuttle camera or sensor 420 having at least one sensor range 430 focused on a downstream end of the main conveyor. A packaging machine 60, such as a Multivac R530, available from Multivac, Inc. of Kansas City, Mo., U.S.A., is located below the main conveyor 120.

In one embodiment, the system comprises a staging conveyor located between the machine 20 and the robot 200. Drafts are conveyed spaced-apart in a stream to a staging conveyor where the stream is converted to lateral rows of drafts. Such a staging conveyor is described in U.S. Pat. No. 5,810,149 and is commercially available as the A*180 Autoloader from Formax, Inc. of Mokena, Ill., U.S.A. Alternatively, the drafts may be placed on the conveyor by the slicing machine in lateral rows of drafts alleviating the need of a staging conveyor.

At the fill station 110 of the packing machine 60, the shuttle robot 100 delivers food products from an upstream main conveyor 120 into containers 131. The containers 131 may be formed in a group of rows of pockets 131 formed in a lower web 133 of film by the packaging machine 60. Downstream of the fill station 110, in the direction D, is a sealing station 170. The containers or pockets 131 that are filled with food product, are sealed by an upper web of film in the sealing station 170.

Figure 1D:
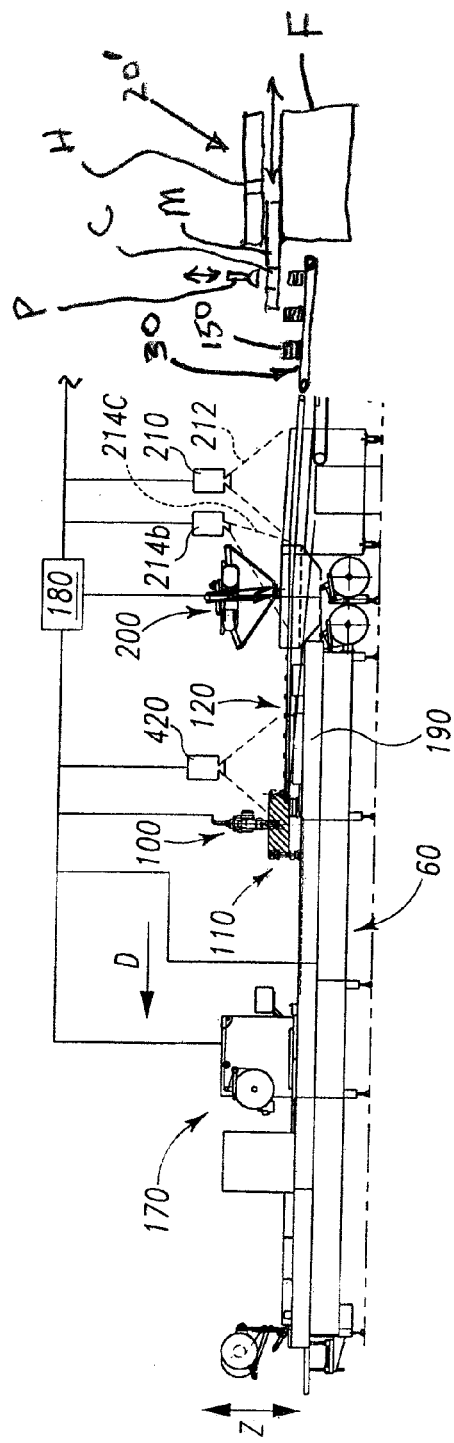
FIG. 1D is a simplified schematic side view the line of FIG. 1C with a food product forming apparatus replacing the slicing apparatus.

The machine 20 may also be replaced by a food product forming machine 20' such as disclosed in, for example, U.S. Pat. Nos. 3,952,478; 4,054, 967; 4,182,003; and 4,329,828, and PCT published applications WO 99/62344, and WO 2005/02766782 A2. The food product forming machine delivers a formed food product or a stack of food products onto an output conveyor 30. Therefore the shingled or stacked drafts 150 may also be formed food products 150, both of which may be referred to as food products 150. The formed food product 150 may be such as those shown in FIG. 6 or may be of another formed shape. Whether the food products 150 lay individually or in stacks on the conveyor 30, the food products may be arranged in rows transverse to the conveying direction. FIG. 1D shows in schematic form the food product forming machine 20'. The forming machine is located upstream from the sensor range, The patty-forming machine has a machine frame "F", a mold plate "M" having at least one cavity "C" and mounted to reciprocate in a longitudinal direction with respect to the frame to position the cavity between a fill position and patty knock out position. A food product delivery channel "H" is for delivering food product into the cavity "C." The food product delivery channel is mounted stationary with respect to the frame and has a fill opening into the cavity when the mold plate is in the fill position. One or more knockout plungers "P" are provided for expelling the formed food product from the mold plate onto the output conveyor 30 when the mold plate is in the knockout position. The output conveyor delivers formed food products onto the main conveyor 120.

A controller 180, such as an electronic circuit, a programmable logic controller (PLC), a microprocessor, a CPU, computer, or other control device, is signal-connected to the shuttle robot 100, the alignment robot, the packing machine 60, the machine 20, a sensor or camera 210, the sealing station 170, and at least one of a vacancy detector 214a and vacancy detector 214b.

The controller may comprise a datastore being a electronic or computer hardware or software memory or harddrive containing predefined values, such as food product orientation values, food product longitudinal position values, food product lateral position values, transverse centerline value representing a transverse position on which selected food products are to be aligned, longitudinal centerline values representing a longitudinal position on which the food products are to be aligned, food product position values. These values may be user defined or predefined for various types of food products. The controller an instruction storage area for storing preprogrammed, user defined, or other instructions that the controller uses to process and/analyze the data according to machine operation programming.

Off-Weight Conveyor

Figure 6:
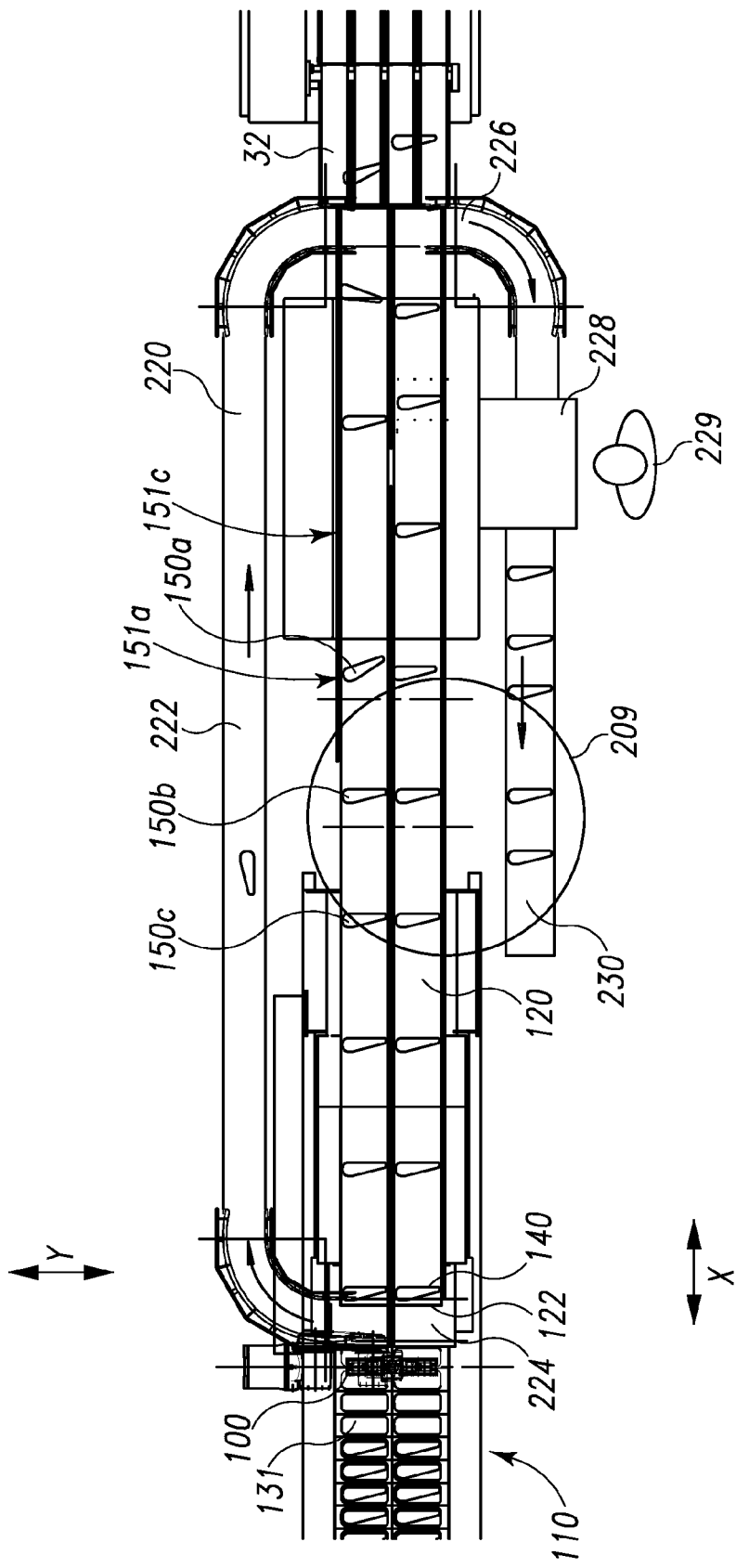
FIG. 6 is an enlarged top view taken from FIG. 2 of a main conveyor, a working area of an alignment robot, an off-weight conveyor, a correction station, a parking station, and a fill station.
Figure 7:
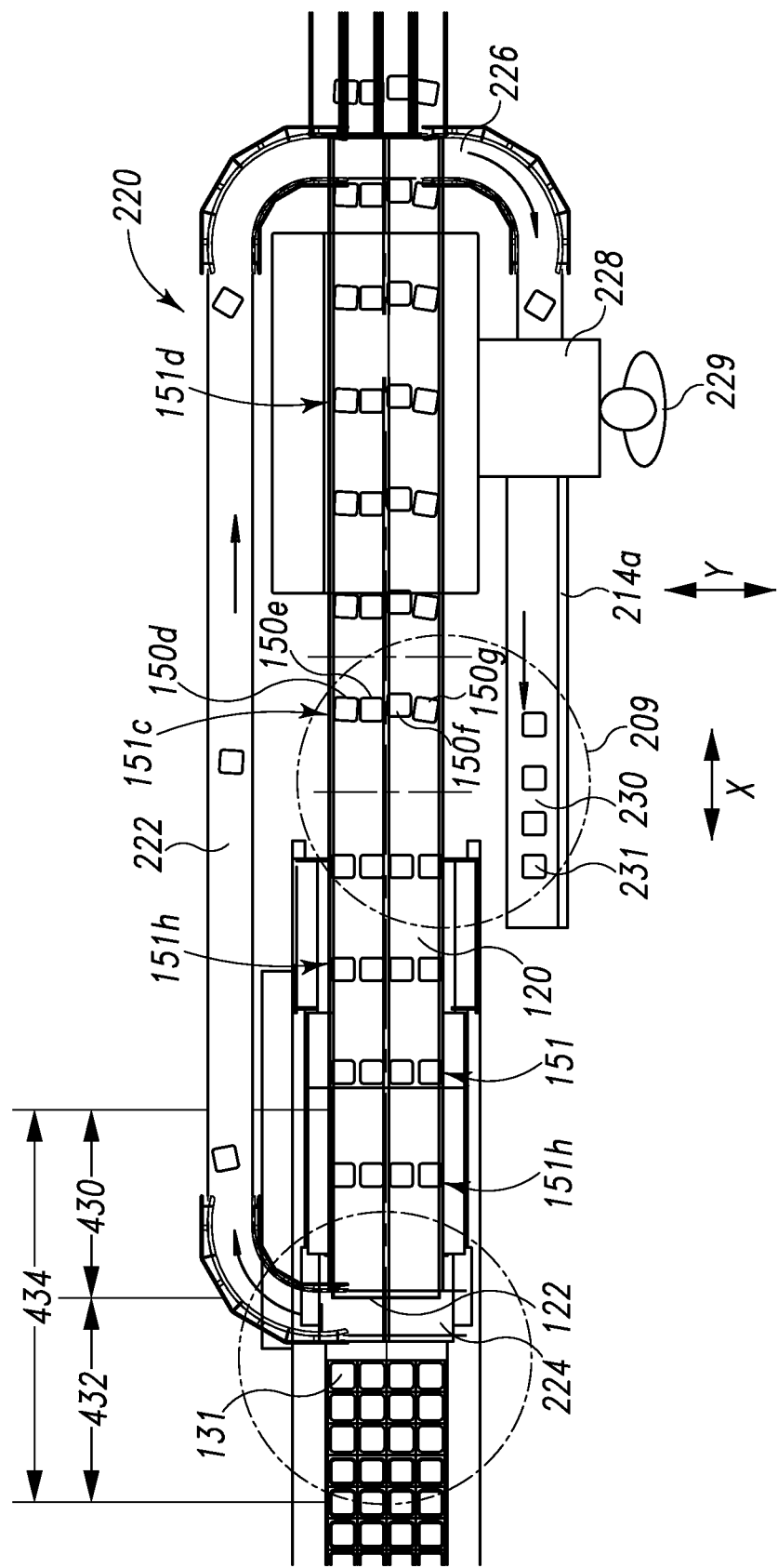
FIG. 7 is an enlarged top view taken from FIG. 2 of the main conveyor, the working area of the alignment robot, the off-weight conveyor, the correction station, the parking station, and the fill station showing food products shaped different from those shown in FIG. 6.

FIGS. 2, 6, and 7 shows the off-weight conveyor 220 comprises an adjacent longitudinal portion 222, a downstream end portion 224, and an upstream end portion 226. The off weight conveyor 200 is connected to a correction station 228, which may be a weight correction station. The weight correction station 229 is connected to a food product parking station 230.

In one embodiment, the longitudinal portion 222 is adjacent and parallel to the main conveyor 120. The weight correction station 228 and the parking station 230 are adjacent and parallel to the main conveyor 120 on a side of the conveyor 120 opposite the longitudinal portion 222. The parking station is downstream 230 from the weight correction station 228. The correction station 228 is connected to the longitudinal portion 222 by the upstream end portion 226. The upstream end portion 226 curves from its connection point with the longitudinal portion to be positioned perpendicularly to the conveying direction. The upstream end portion extends under the main conveyor 120 and curves to connect with the correction station 228. Thus, the upstream end portion 226 forms a U shape as it extends under the main conveyor. In another embodiment, portions of the off-weight conveyor 220 may not curve to connect to one another, but rather may connect at an angle including a right angle. In another embodiment, the upstream end portion 226 may cross the main conveyor 120 non-perpendicularly. Moreover, the upstream end portion may cross above the main conveyor 120.

Figure 4:
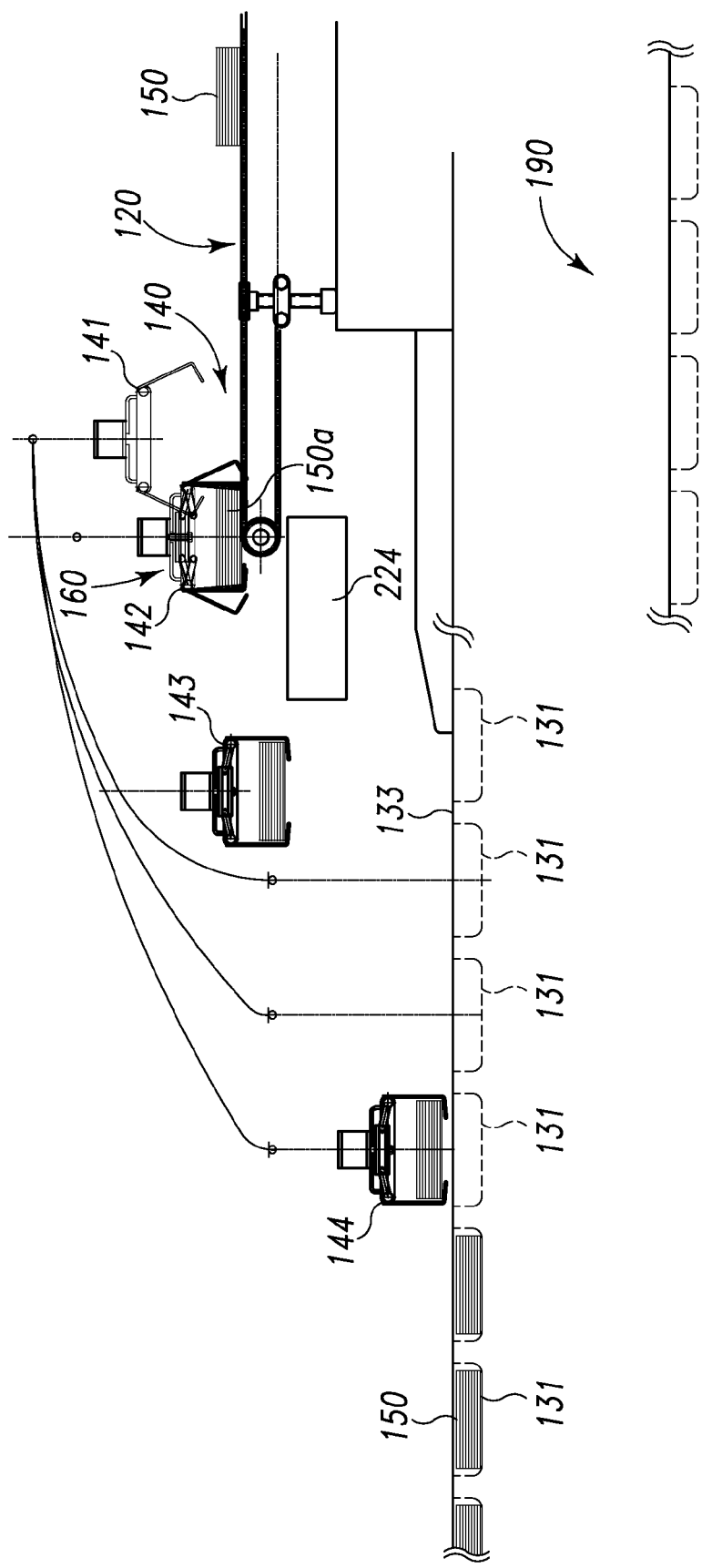
FIG. 4 is a side view of the packing station with the shuttle robot not completely shown.

The downstream end portion 240 is located between a pickup location 140 at a downstream end of the main conveyor 120 and the fill station 110 (FIG. 1). The downstream end portion connects to the longitudinal portion 222 and curves from its connection point with the longitudinal portion to be positioned perpendicularly with the conveying direction. The downstream end portion 224 is vertically positioned below a conveying surface of the main conveyor 120 and above the filling station 110, as best shown in FIG. 4. In another embodiment, the downstream end portion 224 is vertically positioned co-planer with the conveying surface. In another embodiment, the downstream end portion 224 may be positioned non-perpendicularly with respect to the conveying direction.

Alignment Robot

FIG. 1 shows an alignment robot 200 downstream from the food product machine 20 and the output conveyor 30. In one embodiment, the camera or sensor 210 is upstream of the alignment robot 200. The sensor range area 212 of the sensor or camera 210 is focused on an area upstream and or within the working diameter or area 209 of an alignment robot 200. The camera 210 and the alignment robot are signal-connected to a controller 180. In one embodiment, the alignment robot 200 may be a picker robot or a delta robot, such as disclosed in U.S. Pat. Nos. 7,188,544, 6,577,093, and U.S. Patent Application No. 2006/0182602, each patent and patent application being herein incorporated by reference. A device of the basic delta robot concept is disclosed in U.S. Pat. No. 4,976,582 and is incorporated by reference. In another embodiment, the alignment robot 200 may be a four arm picker/delta robot such as the Quattro™ 650 robot manufactured by Adept Technologies Inc. having its corporate headquarters located in Livermore, Calif. in 2008.

Figure 8:
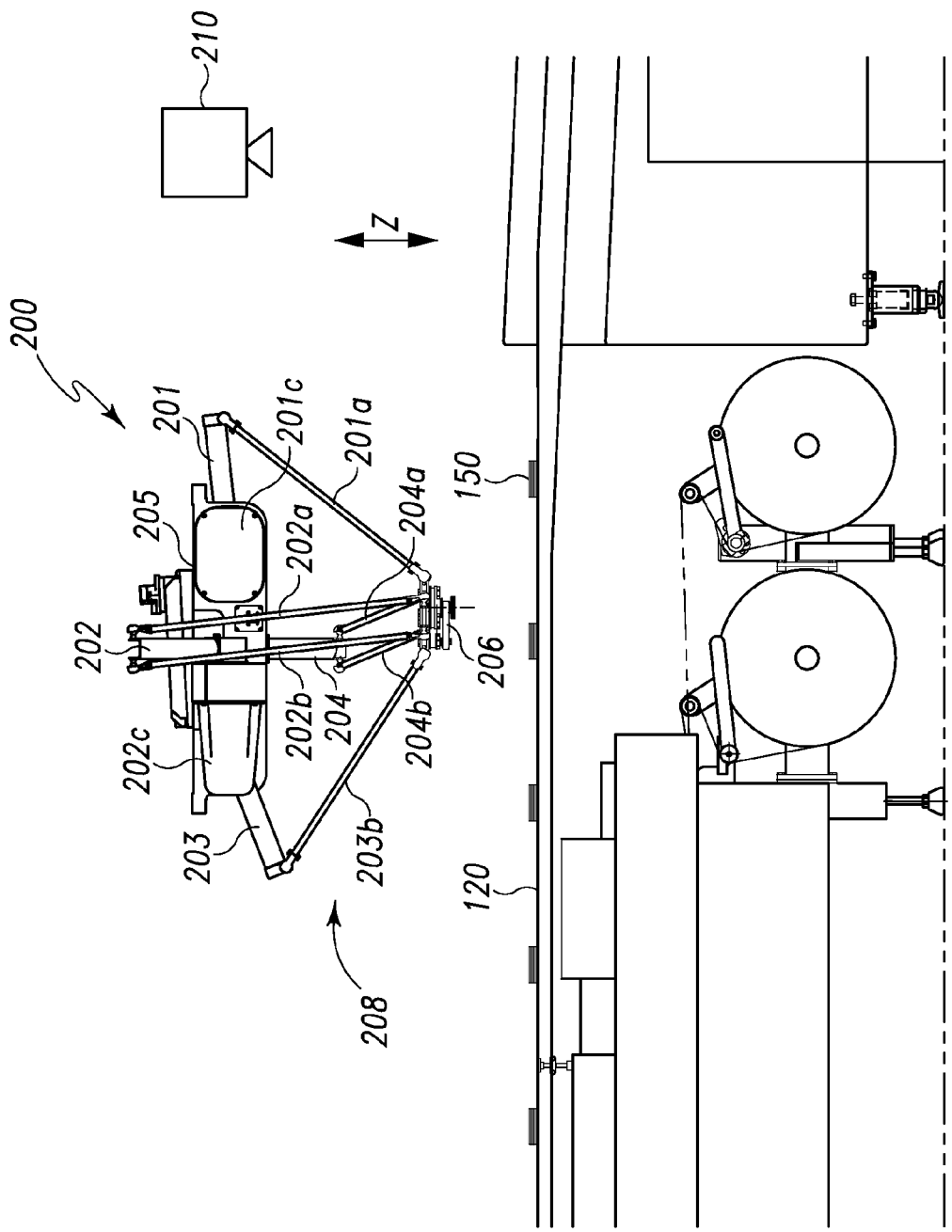
FIG. 8 is a side view of the alignment robot and the main conveyor.

As shown in FIG. 8, the alignment robot 200 is located above the main conveyor 120 and the off weight conveyor 220. In one embodiment the robot has a base 205. Four motors are mounted in the base 205 and move four first arms 201, 202, 203, 204. A pair of pull rods are pivotably attached to each first arm. Pull rods 202a and 202b connect to first arm 202; pull rods 204a and 204b connect to first arm 204; pull rods 201a and 201b (not shown) connect to first arm 201; pull rods 203a (not shown) and 203b connect to first arm 203. Each pair of pull rods pivotably connect to a movable plate 206. The first arms, the connector arms and the movable plate comprise an arm system 208 of the robot. A gripper 160, such the one shown in FIG. 5, may be attached to the movable plate 206 for gripping and moving a food product.

The robot can be placed in a frame construction (not shown) above the conveyor 120. In one embodiment, the arm system 208 is able to rotate with at least three degrees of freedom in Cartesian X, Y and Z directions.

In one embodiment, the robot 200 has the working area or diameter 209 (FIGS. 2, 6, 7) of 1300 mm along the Cartesian x and y axes. The robot 200 has a working height, in the vertical direction or the Cartesian z axis, in the range of 250 mm to 500 mm. The robot has the ability to rotate the movable plate 206 one hundred and eighty degrees in one direction and one hundred and eighty degrees in the opposite direction. The robot has a maximum linear movement speed of 10 meters per second and a rate of acceleration of 150 meters per second squared.

Alignment and Orientation Sensor

In one embodiment, as shown in FIGS. 1, and 8, the alignment and orientation sensor or camera 210 is located upstream of the alignment robot 200 and downstream of the output conveyor assembly 30. Regardless of where the camera 210 is located, the sensor range area 212 of the camera 210 is focused on an area upstream and/or within the working diameter or area 209 of an alignment robot 200. The camera 210 is signal-connected to the controller 180. The camera 210 is mounted on a support structure (not shown) above or adjacent to the conveyor 120.

The camera 210 and controller 180 comprises a vision system. In one embodiment, the camera 210 is that described in U.S. Pat. No. 6,997,089, which is herein incorporated by reference. The vision system is controlled by the controller 180. The controller 180 may be an electronic circuit, a programmable logic controller (PLC), a microprocessor, a CPU or other control device. In one embodiment, the camera 210 and the controller 180 may comprise a single unit.

In one embodiment, the camera 210 is an ELECTRIM EDC-1000N black and white 640×480 pixel digital camera 34 with a 4.8 mm lens. The controller 180 includes a digital frame grabber PC-104 printed circuit board, and a PC-104 CPU main processor board. In this embodiment, the vision system may also include a light source to provide illumination of the food product 150.

Alignment Robot Operation

In operation, the camera 210 scans each food product 150 or each row of food products 151 as they pass under the camera 210 on the conveyor 120 and within the sensor range area 212. The camera sends data to controller 180 concerning various characteristics of the food product 150, including food product position, orientation, and alignment on the conveyor 120. The controller 180 has instructions for analyzing the data.

When the controller executes instructions to determine a particular food product or stack of food products is not in a predefined preferred orientation, the controller 180 will send re-orientation instructions to the robot 200. When misorientated food product 150 is within the working diameter 209, the robot will move the food product to the preferred position and orientation according to the re-orientation instructions from the controller 180.

As shown in FIG. 6, food product 150a is misorientated within food product row 151a. The controller 180 receives position, orientation, and alignment data or information about food product 150a from the camera 210. While or before the food product reaches the working diameter 209, the controller executes analyzing instructions comparing location and orientation values received from the camera to predefined location and orientation values. If a particular food product is determined by the controller to be mis-positioned or mis-orientated, the controller sends instructions to the robot to move food product 150a into a predefined proper or preferred orientation and/or orientation. When food product 150a reaches the working diameter 209 of the robot 200, the robot carries out the instruction and moves and re-orientates the food product so that is it in proper orientation and alignment as shown by food products 150*b* and 150*c*. Food products 150*b* and 150*c* represent food product 150*a* after it is reorientated by the robot and conveyed downstream at various points downstream.

Referring to FIG. 7, the food products of row 151*c* are misaligned longitudinally and transversely with the conveying direction and they are also misorientated. The camera 210 will have obtained position data about each food product at or upstream of the working diameter 209 of the robot 200. Assuming food product 150*e* fits the predefined proper position and orientation, the controller will instruct the robot 200 to move food product 150*d* along the y axis toward the edge of the conveyor 180, rotating it slightly to be square with a plane defined by the conveyor edge. The controller will instruct the robot 200 to move food product 150*f* downstream in the X direction relative to the row 151*c*. The controller will instruct the robot 200 to re-orientate food product 150*g* to be square with the plane defined by the conveyor 120 edge. The robot will carry out these instructions making the appropriate movement of the food products while the food products are within the working diameter 209 so food product row 151*c* is aligned and orientated as shown by food product row 151*h* after the robot carries out the instructions from the controller 180. The controller is able to instruct the robot 200, and the robot is able to carry out any repositioning instructions while the conveyor 120 is in continuous motion. To determine what food products are to be within a particular row, the controller will analyze data from the sensor comprising a row width for food products positioned therein and defining the scope of food products to be considered as within a given row. The row width is a predefined area within which food products are to be aligned on a predefined row alignment within a predefined row.

The controller 180 may be programmed to provide orientation or alignment instructions for food products or food product rows according to any user defined or pre-defined orientation or alignment on the conveyor 120.

Figure 5A:
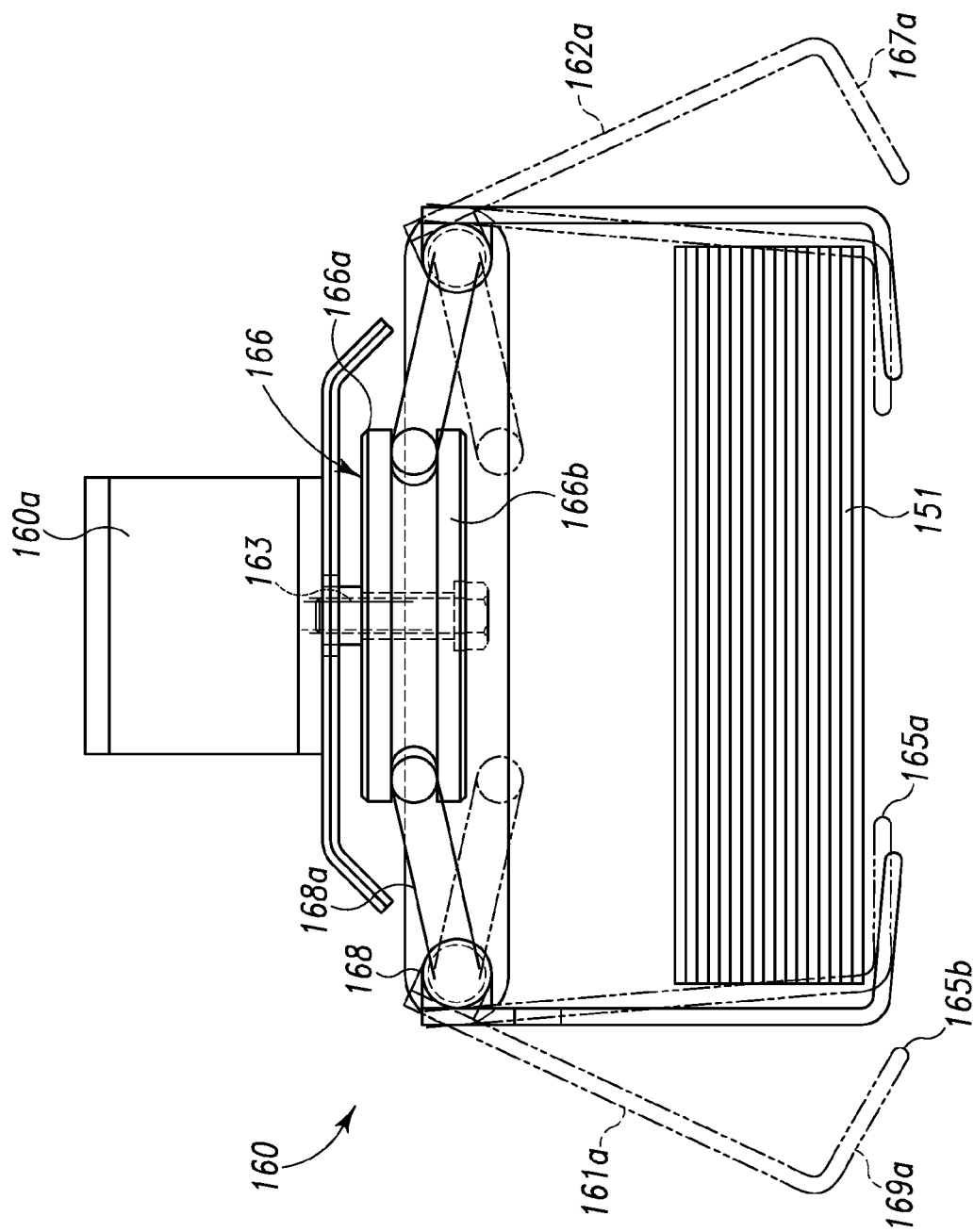
FIG. 5A is a side view of a gripper.

In one embodiment, the camera 210 will detect when a stack of food products 150 is not properly stacked or aligned in the vertical direction along the Cartesian Z axis (FIG. 1). The controller 180 will instruct the robot to correct the vertical mis-alignment, for example, by straightening the stack with the arms 161 (FIG. 5A) of the gripper 160, when the robot has the gripper 160, such as shown in FIG. 5A, attached to the movable plate 206. The robot may also align by moving individual food product of a food product stack to bring the food product stack into the preferred vertical alignment.

Off-Weight Conveyor Operation—Robot Uncorrectable Food Products

In one embodiment, the camera 210 will detect and the controller will determine when a food product/food product stack is not correctable by the alignment robot 200. An uncorrectable food product is when a food product 150 or a stack of food products is misaligned or misorientated to the extent that the robot 200 cannot bring the food product or the stack of food products into the predefined preferred alignment or predefined preferred orientation. When a food product is uncorrectable, the controller will not instruct the robot 200 to correct the food product. In one embodiment, the uncorrectable food product will travel to a downstream end 122 (FIGS. 6, 7) of the main conveyor 120. The controller will not instruct the shuttle robot 100 to pick up the uncorrectable food product or stack or will affirmatively instruct the robot not to pick up the uncorrectable food product. The uncorrectable food product or stack will fall onto the downstream end 224 of the off-weight conveyor 220. Alternatively, in another embodiment, the controller may instruct the shuttle robot 100 to pick up the uncorrectable food product and place it on the downstream end 224 of the off-weight conveyor 220.

The off-weight conveyor 220 will convey the robot-uncorrectable food product to the off-weight station 228 where it will be corrected by a human 229 or another robot, or it will be discarded or recycled. At the off-weight station 228, the food product may be added or subtracted to bring the food product or food product stack to a predefined weight or a predefined weight range. The food product may also be restacked, aligned or orientated at the off-weight station 228. The corrected food product is moved to the parking station 230.

Off-Weight Conveyor—Weighing and Classifying Conveyors

As shown in detail in FIG. 1A, in one embodiment, the output conveyor 30 includes a classifier conveyor system 40, such as described in U.S. Pat. No. 5,499,719, which is herein incorporated by reference. A classifier conveyor 42 is selectively pivoted by an actuator 44, by signal from the controller 180, to deliver food products alternately to the off-weight conveyor 220 or the main conveyor 120. The actuator 44 can be a pneumatic cylinder with an extendable/retractable rod 46 connected to the classifier conveyor 42.

The weighing conveyor 32 is located upstream of the classifying conveyor 42. The weighing conveyor 32 signals to the controller 180 the weight of each food product or food product stack that passes over the weighing conveyor 32. When the controller 180 determines that a particular food product or food product stack is not within a pre-defined weight range or a specific pre-defined weight, the controller 180 signals to the classifying conveyor 42 to lower the classifying conveyor to a reject position 42*b*. In the reject position 42*b*, the classifying conveyor connects to the upstream end portion 226 of the off-weight conveyor 220. The off-weight food product is then carried by the off-weight conveyor 200 to the weight correction station 228. When the classifying conveyor 42 is in a raised accept position 42*a*, it connects with the main conveyor 120.

The off-weight conveyor 220 will convey the off-weight food product to the off-weight station 228 where it will be corrected by a human 229 or another robot; it will be discarded or recycled. At the off-weight station 228, food product slices may be added or subtracted to bring the food product or food product stack to a predefined weight or a predefined weight range. The food product may also be restacked, aligned or orientated at the off-weight station 228. The corrected food product is then moved to the parking station 230.

Optical Grading System and Classifying Conveyor

In one embodiment, the output conveyor 30 comprises an optical grading system 70, such as disclosed in U.S. Pat. No. 6,997,089, which is incorporated by reference. FIG. 1B illustrates the optical grading system 70 which captures the image of the slice passing on the weighing conveyor 32. When the weighing conveyor 32 senses the slice to be viewed on the scale, the controller 180 triggers the system 70 to capture the slice image. The system 70 will capture an image of the top of the slice on top of the stack 150 or, in the case of a single slice, the top of the slice. The optical grading camera 34 captures the slice image within an image field of vision 49 pixel-by-pixel. The shutter speed of the camera is fast enough to capture the image while the slice or stack is in motion. The image is then retrieved from the digital frame grabber printed circuit board into the memory of the system 70 or of the controller 180.

Software can then perform various analyses on the digital image data. The software may be contained in the system 70, or in the CPU 12, or in the controller 180. The slice perimeter or boundary dimensions are determined due to the brightness or color contrast between the slice and the weigh scale belting on which the slice is transferred. A grayscale analysis, pixel-by-pixel, can be undertaken by the software, wherein black is 0 and white is 255. An experimentally determined grayscale cutoff point between fat pixels (light) and lean pixels (dark) can be used to characterize each pixel as being fat or lean. The ratio of light pixels (fat) to dark pixels (lean) within the slice boundary is then calculated, as representative of a fat-to-lean ratio. Additionally, local areas constituting "flaws" in the slice can be quantified in size, by calculating and summing adjacent non-lean pixels, and then compared to a flaw tolerance or limit. A flaw can be a fat deposit, a gland, muscle or bone piece, a void, or other undesirable bit.

Alternatively, the calculations and routines utilized to capture and evaluate slice image data can be as described in U.S. Pat. Nos. 4,136,504; 4,226,540 and/or 4,413,279, all herein incorporated by reference. The mathematical analysis of pixel data can be as described in U.S. Pat. No. 5,267,168, herein incorporated by reference.

The data is calculated and compared to predetermined standards or customer programmable standards regarding overall fat content and flaw size and/or quantity limits.

A calculation is made to determine whether the slice is to be classified as a "pass", that is, being below stringent fat content or flaw limits, or "reject", that is being above acceptable fat content or flaw limits, or "grade-off", that is being below acceptable fat content or flaw limits but above stringent fat content or flaw limits.

Based on the calculated parameters and the comparison to the pre-selected tolerances, the slice is determined to be a grade reject if the fat-to-lean ratio is greater than the allowable tolerance, or if the slice includes a flaw, or a pre-selected number of flaws, greater in size, individually and/or in the aggregate, than an allowable tolerance. These tolerances can be adjustable and determined by the user, typically as a plant standard.

Advantageously, in the production of straight stacks or shingled stacks of sliced product, each slice need not the scanned, rather, the top of each stack can be scanned to determine a fat-to-lean ratio, and the presence of flaws, after the stack has been cut and stacked from the loaf. The condition of the top slice, being cut from the loaf in the close vicinity of the remaining slices in the stack, is an accurate representation of the condition of all the slices in the stack.

When grading stacks of slices, the top slice of one stack is almost an exact representation of the bottom slice of the following stack. It may be advantageous to remember this image of the top slice of a stack and "flag" it as also representing the bottom of the next stack to pass below the camera. Combined with the next following image, the actual top of the stack, it can be accurately estimated, by evaluating the bottom and top slices of the stack, whether the entire stack meets the quality criteria. According to this procedure, it is not necessary to image each and every slice in the stack or draft to accurately characterize the quality of the stack.

Thus, the stack can then be characterized as a grade reject, grade off or acceptable stack based on the characteristics of one slice of the stack or based on the characteristics of the top and bottom slices of the stack.

If the slice or stack of slices is determined to be a grade reject, the classifier conveyor 42 will be pivoted by the actuator 44, by signal from the controller 180 to put the classifier conveyor in a reject position 42b. The reject position will direct the slice or stack of slices onto the off-weight conveyor 220. All out-of-weight tolerance slices or groups of slices, regardless of their visual acceptance, can be placed on the off-weight conveyor 220. Products placed on the off-weight conveyor are moved to the correction station 228, where they may be corrected by weight, orientation, or position, or they may be removed from the station 228 for disposal or recycling. If the operator 229 or other machine of the correction station 228 corrects the food product then is it optionally moved to the parking station 230.

Vacancy Filling

In one embodiment, the system has a vacancy reduction device or system that includes the alignment robot 200 also serving as a vacancy filling robot. When the classifier conveyor 42 diverts a food product to the off-weight conveyor 230 a vacancy is created in the food product stream on the conveyor 120. An example vacancy is shown in food product row 151c in FIGS. 6 and 7. The camera or vacancy detector 210 will signal to the controller 180 that a vacancy exists in a particular location on the conveyor. Such a vacancy is shown by the absence of at least one food product as shown in food product row 151c in FIG. 6 and food product row 151d in FIG. 7. A parking station sensor or food product detector 214a will signal to the controller when a food product is parked at the parking station 230. The vacancy detector 214a, as shown in FIG. 7, may be located adjacent to the parking station 230 or underneath (not shown) the parking station surface. Alternatively, the vacancy detector may be a sensor or camera 214b (FIG. 1), such as the type of camera 210 described above, mounted to focus the sensor range area 214c on the parking station. In one embodiment, the parking station sensor sends a signal to the controller 180 indicating the number of food products or food product stacks parked at the parking station 230.

The controller will instruct the robot to take a food product from a position on the parking station to fill a vacancy, if there is a food product available at the parking station when the vacancy is in the working diameter 209 of the robot. If the product was removed from the parking station the parking station will advance another available food product to fill the vacancy created by removal of the food product that filled the vacancy on the main conveyor 120. In one aspect of the embodiment, if the food product was parked in the first position 231 then a conveying surface of the parking station will advance the next food product to the first position in the parking station. If there are no products in the parking station, the parking station conveying surface may stop advancing while the entire parking station is empty.

The controller is able to fill any vacancy in the food product stream, regardless of how it was created as long as it was created before the vacancy area advances out of the sensor area range 212 of the conveyor 120.

Shuttle Sensor

In one embodiment, as shown in FIGS. 1, and 8, the shuttle sensor or camera 420 is at the end of the main conveyor. Regardless of where the camera 420 is located, the shuttle sensor 420 has at least one sensor range 430, as shown in FIG. 7. The sensor range 430 comprises an end portion of the main conveyor. The sensor range 430 may include the width of the main conveyor 120. In another embodiment, the sensor 420 has a second sensor range 434 that comprises at least a portion 432 of the packing station 110. The second sensor range 434 may encompass the shuttle working area 410. The sensor 420 detects food products, such as those shown in food product row 151h in FIG. 7. The camera 420 is mounted on a support structure (not shown) above or adjacent to the downstream end 224 of the main conveyor 120.

The camera 410 and controller 180 comprises a second vision system. The vision system of the camera 210 and the controller 180 may comprise the second vision system. In one embodiment, the camera 410 is that described in U.S. Pat. No. 6,997,089, which is herein incorporated by reference. The vision system is controlled by the controller 180. The controller 180 may be an electronic circuit, a programmable logic controller (PLC), a microprocessor, a CPU or other control device. In one embodiment, the camera 420 and the controller 180 may comprise a single unit.

In one embodiment, the camera 420 is an ELECTRIM EDC-1000N black and white 640×480 pixel digital camera 34 with a 4.8 mm lens. The controller 180 includes a digital frame grabber PC-104 printed circuit board, and a PC-104 CPU main processor board. In this embodiment, the vision system may also include a light source to provide illumination of the food product 150.

Shuttle Robot

FIGS. 3 and 4 illustrate the shuttle robot 100 of the system. The main or upstream conveyor 120 delivers food products 150 to the packing station 110. The conveyor 120 may operate in a state of continuous motion. The food products 150 may be delivered in rows 151 where the number of food products 150 in the rows 151 correspond to the number of pockets or containers 131 in a row of containers 132.

The shuttle robot 100 may be suspended above or located adjacent to the filling station 110 by a structure (not shown), so that the robot gripper 160 operates at least over the filling station and a downstream portion of the main conveyor 120. The filling station 110 is adjacent to the main conveyor 120. The shuttle robot has a range of motion covering Cartesian X, Y and Z directions such that the robot may move transversely and longitudinally with respect to the conveying direction and also vertically. In one embodiment, the shuttle robot operates in the shuttle working area 410. The shuttle robot comprises a gripper 160 at a bottom of the shuttle robot 100.

In one embodiment, the shuttle robot 100 is a six-axis robot having six degrees of freedom, such as disclosed in U.S. Pat. No. 5,901,613, which is incorporated by reference. A device of the basic six-axis robot concept is disclosed in U.S. Pat. No. 4,773,813, which is incorporated by reference. In another embodiment, the shuttle robot 100 may be a six-axis robot such as one of the Viper™ s650, s850, s1300, or s1700 robots manufactured by Adept Technologies Inc. having its corporate headquarters located in Livermore, Calif. in 2008. In another embodiment, the shuttle robot may be another type of robot having a working range in the Cartesian X, Y and Z directions.

In one embodiment, the robot 100 has a maximum payload in the range of 5 kg to 20 kg, a reach in the range of 653 mm to 1717 mm, and a repeatability rating in the range of plus or minus 0.020 mm to plus or minus 0.070 mm. In one embodiment, the robot has a joint range of motion for each joint as follows: joint 1 ±180°, joint 2 −200°, +65°, joint 3 +35°, +190°, joint 4 ±200°, joint 5 ±140°, joint 6 ±360°.

Figure 5C:
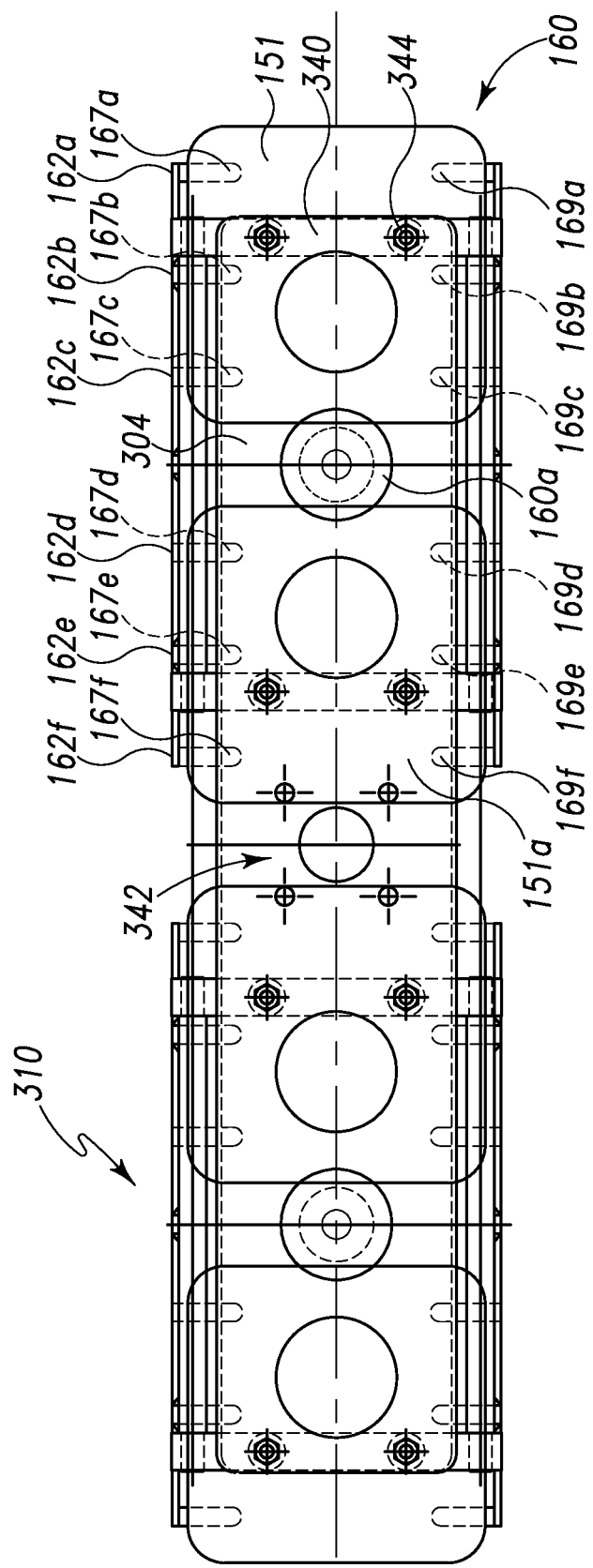
FIG. 5C is a top view of the gripper.

As shown in detail in FIGS. 5A, 5B, and 5C, the gripper 160 has a plurality of first arms 161a-f, and a corresponding plurality of oppositely facing second arms 162a-f. The first arms are connected together along or formed into a horizontal arm connection shaft 301. Similarly the second arms 162a-f are connected together along or formed into a horizontal arm connection shaft (not shown). The arms move between an open position 165b and a closed or holding position 165a.

Each arm may have a lower support 169a-f, 167a-f for supporting a bottom of a food product. Each arm is connected at a pivot point 168 to a horizontal arm 168a. The pivot point may lie on the horizontal arm connection shaft. Each horizontal arm is connected to a position plate 166. The position plate 166 moves vertically by a pin 163 between a raised position 166a and a lowered position 166b by a solenoid 160a operatively connected to the pin 163. The vertical movement of the position plate 166 causes each arm 161 to pivot about the pivot point 168. The arms 161 are in the closed position 165a when the position plate 166 is in the raised position 166a, and the arms 161 are in an open position 166b when the position plate is in a lowered position 166b.

In one embodiment, the gripper 160 is connected to a cross plate 340 by a plurality of bolts 344 (not shown in FIG. 5A). The cross plate 340 is capable of supporting more than one gripper, such as gripper 310. Gripper 310 is constructed and operates in the same manner as gripper 160. The cross plate connects to the shuttle robot 100 at a connection location 342 with a plurality of bolts 344, 346.

When the containers are pockets 131 formed from a web 133, the packaging machine 60 has a dwell period. At the dwell period, the packaging machine 60 stops the motion of the lower web 133. During the dwell period, the packaging machine 60 forms another group of empty pockets 131 upstream from the packing station 110 at a container-forming station 190. The container forming station 190 is shown schematically in FIG. 4. After the dwell time period is over, the lower web of film 133 is advanced and new food products are deposited into new containers 131 as or after the lower web 133 advances to a new dwell position.

The shuttle robot 100 has at least one pickup location 140 at an end of the main conveyor 120 and at least one deposit position located 144 above a container 131 in the filling station 100. The shuttle robot 100 may have a plurality of deposit positions located above a plurality of containers 131a in the filling station 100. The filling station 100 may hold any number of containers for filling. FIG. 4 shows a filling station having four containers 131 or four rows of containers.

During the dwell period, the robot 100 moves between the pickup position(s) and the deposit positions to move food products from the main conveyor 120 to the containers 131, 131a.

The shuttle sensor 420 detects food products on a downstream end of the main conveyor within the sensor range 430 or second sensor range 434. The shuttle sensor sends information to the controller regarding the location of food products within the sensor range. The controller determines whether and at what point the food products within the sensor range should be picked up and moved to the packaging station or the off weight conveyor by the shuttle robot. The controller instructs the robot to pickup one or more food products from the main conveyor at a location based on the location information received from the shuttle sensor. In one embodiment, the sensor detects which containers 131 in the packaging station are filled with food product and which are not filled with food product and sends that packaging fill information to the controller. The controller may instruct the robot to move food products from the main conveyor to the empty or incompletely filled containers in the packaging station based on the packaging fill information from the sensor.

As shown in FIG. 4, during each pass between a particular pickup location and a drop or deposit location, the gripper 160 of the shuttle robot 100 grips a food product or stack of food products at the pickup location 140 on the main conveyor 120. The shuttle robot may approach the pickup location 140 in an open position as shown at 141. The shuttle robot 100 surrounds the food product 150a with the gripper 160 at the pickup location and moves the arms 161 of the gripper to a closed position. The conveyor 120 may be in continuous movement during this time such that the pickup location 140 and the shuttle robot 100 are in continuous motion tracking the location of the food product 150a.

The shuttle robot then moves the food product continuously or intermittently through a plurality of intermediate locations 143 to a particular deposit location 144 located above a container 131. The container 131 may be empty or may be incomplete. When the shuttle robot is in deposit location 144 with a gripped food product, the gripper 160 will move to an open position releasing the food product to fall into the container 131.

In one embodiment, as shown in FIG. 5B, the main conveyor 120 is a strip or o-ring belt conveyor. Such a strip conveyor has a conveying surface having multiple belts or strips 330, 332, 334, 336 with gaps 331, 333, 335 provided between the belts. The belts are driven to rotate by a drive shaft 321 and operate around an idler shaft (not shown) opposite the drive shaft. The gaps between the belts of the strip conveyor are such that the food products 151, 151a being conveyed do not fall between the gaps. In one embodiment, the strip conveyor is in continuous movement as the gripper approaches one or more target food products on the strip conveyor. The gripper is in or is moved to an open position. The gripper tracks the movement of the food product(s) on the conveyor as the gripper lowers around the food product(s). The shuttle robot lowers the lower supports 169a-f, 167a-f of the arms 161a-f, 162a-f of the gripper 160 into the gaps of the strip conveyer below the conveying surface. The arms of the gripper are then closed bringing the lower supports 169a-f, 167a-f under the food products 151, 151a. The shuttle robot 100 then lifts the food product off the strip conveyor by bringing the lower supports 169a-f, 167a-f above the conveying surface and moves the food product towards destination packaging.

In one embodiment, the shuttle robot may move food product to a container 101 while the container is moving into the packing station 110. The shuttle robot may move and track the position of a container 131 and release a food product into the container while the container is moving into the packing station and before it is stationary during the dwell period. Loading food products into the containers 131 during the advance time period is a time efficient way to load the pockets.

After the containers 131 in the packing station have been loaded with food product, the group of containers in the packing station is advanced downstream to a sealing station 170. Containers 131 in the sealing location are sealed closed by the application of an upper web of film. The controller 180 synchronizes movement of the shuttle robot with the movement of the containers 131 and the conveyor 120 when needed.

The shuttle robot may fill the containers in any order, including filling the container closest to the main conveyor 120 first and filling containers progressively toward the container located within the fill station and furthest from the main conveyor. Alternatively, the shuttle robot may fill the containers in reverse, wherein the first filled row of containers is the row furthest upstream in the direction D (FIG. 1), and the shuttle robot advances to fill the second row, then advances again to fill the third row, etc. After the group of rows is filled during the dwell period, the containers 131 advance and an empty new group of containers 131 is moved into the fill station 110.

In one embodiment, the gripper is configured to grip one food product or one stack of food products. In another embodiment, the shuttle robot has a gripper that is a row gripper capable of gripping more than one food product or an entire transverse row of food products and moving those food products to fill a transverse row of containers 131 in the fill station. In another embodiment, the row gripper has multiple corresponding pairs of gripping arms for gripping each food product of a row individually. This allows individual food products to be selectively gripped. The row gripper is capable of moving less than an entire transverse row of food products by selectively gripping the food products. This may be desirable if one or more of the food products of a food product row is uncorrectable or otherwise unsatisfactory for packing in one or more aspects, such as weight, form, or visual presentation.

In another embodiment, the row gripper is capable of gripping a longitudinal row or column of two or more food products to move and fill a longitudinal row of containers in the fill station. In another embodiment the row gripper has multiple corresponding pairs of gripping arms for gripping each food product of a longitudinal row individually. This allows individual food products to be selectively gripped. The row gripper is capable of moving less than a longitudinal row of food products by selectively gripping the food products. In another embodiment, the shuttle robot may comprise multiple shuttle robots for gripping and moving food products between the main conveyor and the packing station.

From the foregoing, it will be observed that numerous variations and modifications may be effected without departing from the spirit and scope of the invention. It is to be understood that no limitation with respect to the specific apparatus illustrated herein is intended or should be inferred. It is intended to cover by the appended claims all such modifications as fall within the scope of the claims.

The invention claimed is:

1. A positioning system for positioning food products, comprising a robot configured to move food products;
   a main conveyor having a main conveying surface configured to move food products;
   a food processing apparatus for depositing food products in a pre-selected format of rows and columns onto said main conveying surface;
   an electronic sensor configured to capture position data about food products on the main conveying surface within a sensor range of the sensor;
   a controller signal-connected to the electronic sensor and the robot; the controller being configured to receive data captured by the sensor and configured to instruct the robot to move a food product that is not correctly positioned within the pre-selected format to a corrected position within the pre-selected format.

2. The positioning system of claim 1, wherein the sensor comprises a camera.

3. The positioning system of claim 1, wherein the robot has a longitudinal working range for positioning a one or more food products to the corrected position either upstream or downstream from an original position of the food product with respect to a conveying direction of the main conveying surface.

4. The positioning system of claim 1, wherein the robot has a lateral working range for positioning one or more food products to the corrected position transverse from an original position of the food product in relation to a conveying direction of the main conveying surface.

5. The positioning system of claim 1, wherein the sensor captures an orientation of one or more food products on the main conveying surface within the sensor range.

6. The positioning system of claim 1, wherein the controller comprises instruction for determining whether a food product is in a mis-orientated position on the main conveying surface by comparing a measured orientation with a predefined orientation or a predefined orientation range; and,
the controller comprises instructions for directing the robot to move a particular food product from the misorientated position to a corrected orientation; and
wherein the robot has a rotatable gripper for rotating an orientation of one or more food products about at least one axis of rotation.

7. The positioning system of claim 1, wherein the controller comprises instruction for determining whether a food product is in a misaligned position on the main conveying surface; and,
the controller comprises instructions for directing the robot to move a particular food product from the misaligned position to an aligned position.

8. The positioning system of claim 1, wherein each food product has a transverse position and a longitudinal position on the main conveying surface, and wherein the sensor is capable of generating a signal representing a captured position including the transverse and the longitudinal position of one or more food products on the main conveying surface within the sensor range, and wherein the controller has position determining instructions configured to compare the captured position with a predefined position to determine whether the product is mis-positioned; and the controller is configured to send corrected food product movement instructions to the robot to move an mis-positioned food product to a corrected food product position.

9. The positioning system of claim 1, wherein the controller comprises a datastore having at least one predefined transverse centerline value representing a transverse position on which selected food products are to be aligned to form a transverse row on the main conveying surface; the controller comprises a misaligned food product calculating instruction for determine whether a measured food product position value received from the sensor is outside of the transverse centerline value; and
wherein the controller is configured to instruct the robot to move one or more misaligned food products into an alignment position on the transverse centerline.

10. The positioning system of claim 1, wherein the controller comprises a datastore having at least one predefined longitudinal centerline value representing a longitudinal position on which the food products are to be aligned to form a transverse row on the main conveying surface; and the controller comprises a misaligned food product calculating instruction for determine whether a measured food product position value received from the sensor is outside of the longitudinal centerline value; and
wherein the controller is configured to instruct the robot to move misaligned food products into an alignment position on the longitudinal centerline.

11. The positioning system of claim 1, wherein the robot is configured to re-positioning food products on the main conveying surface while the main conveying surface is moving.

12. The positioning system of claim 1, wherein the robot is configured to re-orientate food products while the main conveying surface is moving.

13. The positioning system of claim 1, wherein the food product processing apparatus comprises a high speed food product slicing machine for cutting off a series of slices from a food loaf, the slicing machine is located upstream from the sensor range and produces food products received by the main conveying surface; the slicing machine having a rotatable slicing blade, a conveying assembly, and a support for holding a loaf in a cutting path of the rotatable slicing blade, the slicing blade arranged to rotate in the cutting path to slice drafts from the loaf, on the conveying assembly and the drafts are transported by the conveying assembly onto the main conveyor.

14. The positioning system of claim 1, wherein the food product processing apparatus comprises a food patty forming machine located upstream from the sensor range, the patty forming machine for producing food products received by the main conveying surface; the patty-forming machine having a machine frame, a mold plate having at least one cavity and mounted to reciprocate in a longitudinal direction with respect to the frame to position the cavity between a fill position and patty knock out position, a food product delivery channel for delivering food product into the cavity, the food product delivery channel mounted stationary with respect to the frame and having a fill opening into the cavity when the mold plate is in the fill position, one or more knockout plungers for expelling the formed food product from the mold plate onto an output conveyor when the mold plate is in the knockout position, the output conveyor delivering formed food products onto the main conveyor.

15. A positioning system of claim 1, further comprising an off-weight conveyor located adjacent to the main conveying surface for receiving food products that are not correctable by robot manipulation.

16. A positioning system of claim 15, further comprising a shuttle robot configured to move between a pickup area on the main conveyor and a drop area on the off- weight conveyor.

17. A positioning system of claim 15, further comprising a correction station adjacent to an off-weight conveyor; and
the correction station configured to align a position of a food product or configure to add or subtract food product from a food product so that the food product matches a predefined weight.

18. A positioning system of claim 1, further comprising an off-weight conveyor, the off-weight conveyor comprising a downstream end, an upstream end, and a longitudinal portion;
the downstream end is adjacent to a downstream end of the main conveyor, the longitudinal portion runs upstream from the downstream end of the of-weight conveyor along the main conveyor, and the upstream end of the off-weight conveyor crosses the main conveyor is adjacent to a correction station on a side of the main conveyor opposite the longitudinal portion.

* * * * *

UNITED STATES PATENT AND TRADEMARK OFFICE
CERTIFICATE OF CORRECTION

PATENT NO. : 8,627,941 B2  
APPLICATION NO. : 12/606846  
DATED : January 14, 2014  
INVENTOR(S) : Scott Lindee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
Thirtieth Day of May, 2017

Michelle K. Lee
*Director of the United States Patent and Trademark Office*